(12) United States Patent
Galipaud

(10) Patent No.: US 9,352,382 B2
(45) Date of Patent: May 31, 2016

(54) SCREW OR NUT WITH A THREAD A PITCH OF WHICH VARIES AND TOOL TO PRODUCE SAID SCREW OR NUT

(75) Inventor: Joachim Galipaud, Trehuson (FR)

(73) Assignee: LISI AEROSPACE, Saint Ouen L'Aumone (FR)

( * ) Notice: Subject to any disclaimer, the term of this patent is extended or adjusted under 35 U.S.C. 154(b) by 223 days.

(21) Appl. No.: 13/146,195

(22) PCT Filed: Jan. 19, 2010

(86) PCT No.: PCT/FR2010/050072
§ 371 (c)(1),
(2), (4) Date: Jul. 25, 2011

(87) PCT Pub. No.: WO2010/086538
PCT Pub. Date: Aug. 5, 2010

(65) Prior Publication Data
US 2011/0280683 A1    Nov. 17, 2011

(30) Foreign Application Priority Data

Jan. 29, 2009 (FR) .................................... 09 50555

(51) Int. Cl.
*F16B 33/02* (2006.01)
*B21H 3/02* (2006.01)
(Continued)

(52) U.S. Cl.
CPC ............... *B21H 3/022* (2013.01); *B21H 3/04* (2013.01); *B21H 3/06* (2013.01); *B21H 3/08* (2013.01); *F16B 33/02* (2013.01)

(58) Field of Classification Search
CPC ....... F16B 25/0073; F16B 39/30; F16B 33/02

USPC ........... 411/366.3, 411, 415, 307, 929, 937.1, 411/436
See application file for complete search history.

(56) References Cited

U.S. PATENT DOCUMENTS 146,023 A * 12/1873 Russell .......................... 411/415
1,922,689 A * 8/1933 Linnenbruegge ................ 470/9
(Continued)

FOREIGN PATENT DOCUMENTS

DE  103 31 713   2/2005
DE  103 30 643   3/2005
(Continued)

OTHER PUBLICATIONS

WIPO; International Search Report for PCT/FR2010/050072; May 31, 2010; 3 pages.

*Primary Examiner* — Roberta Delisle
(74) *Attorney, Agent, or Firm* — Henricks, Slavin & Holmes LLC

(57) ABSTRACT

The distribution of load stresses on threads engaged with a standard screw or nut is very unequal. Indeed, the first threads in engagement support a large majority of the load. So if the load is too important, the threads give way and the function is not provided any more by the screw or the nut. In the prior art, threads are known whose depth or pitch varies a lot in order to cause a self-clamping. In particular, the invention aims at optimizing the resistance and the fatigue resistance of the screws by distributing the load at the very best on their threads without causing this self-clamping. It was shown that the control of the pitch variation, within a chosen pitch tolerance, makes it possible to control the stress distribution on the threads. It is possible to determine a different variation for each load case encountered.

13 Claims, 4 Drawing Sheets

Figures 3B, 3C:
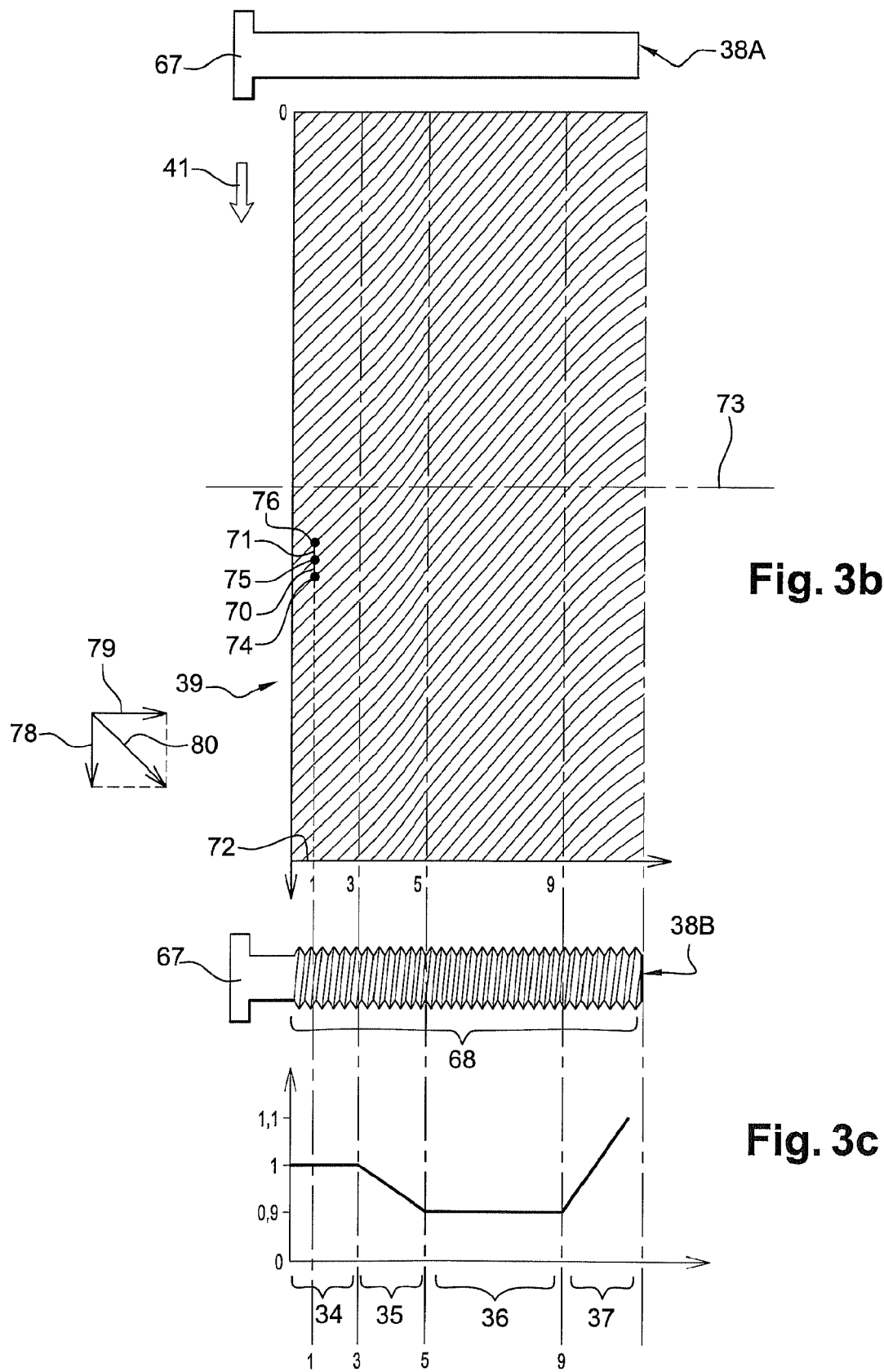

(51) Int. Cl.
B21H 3/04 (2006.01)
B21H 3/06 (2006.01)
B21H 3/08 (2006.01)

(56) References Cited

U.S. PATENT DOCUMENTS

| | | | | |
|---|---|---|---|---|
| 2,842,180 | A | * | 7/1958 | Brown et al. ................. 411/285 |
| 3,079,181 | A | * | 2/1963 | Van Der Wissel ............ 285/333 |
| 3,454,070 | A | * | 7/1969 | Phipard, Jr. .................. 411/168 |
| 3,481,380 | A | * | 12/1969 | Breed ........................... 411/309 |
| 3,664,540 | A | * | 5/1972 | Witkin .......................... 220/288 |
| 3,799,229 | A | * | 3/1974 | Johnson ........................ 411/307 |
| 4,364,136 | A | * | 12/1982 | Hattan ............................. 470/21 |
| 4,369,644 | A | | 1/1983 | Min-Chin et al. |
| 4,842,464 | A | * | 6/1989 | Green ........................... 411/307 |
| 4,956,888 | A | * | 9/1990 | Green ............................. 470/25 |
| 5,259,398 | A | * | 11/1993 | Vrespa ......................... 128/898 |
| 5,403,136 | A | * | 4/1995 | Mathys ......................... 411/310 |
| 6,030,162 | A | * | 2/2000 | Huebner ....................... 411/413 |
| 6,572,315 | B1 | * | 6/2003 | Reed ............................. 411/307 |
| 6,726,420 | B2 | * | 4/2004 | Ward et al. .................... 411/436 |
| 6,789,993 | B2 | * | 9/2004 | Ozawa et al. ................. 411/546 |
| 7,578,836 | B2 | * | 8/2009 | Justin et al. ................... 606/301 |

FOREIGN PATENT DOCUMENTS

| | | | |
|---|---|---|---|
| DE | 102004029305 A1 * | 2/2006 | ............. F16B 25/00 |
| DE | 10 2007 007808 | 8/2007 | |
| EP | 0 296 594 | 12/1988 | |
| EP | 1 655 090 | 5/2006 | |
| GB | 569581 | 5/1945 | |
| GB | 1 454 769 | 11/1976 | |
| JP | 57-94439 | 6/1982 | |
| JP | 2007-321858 | 12/2007 | |
| WO | WO 02/100570 | 12/2002 | |

* cited by examiner

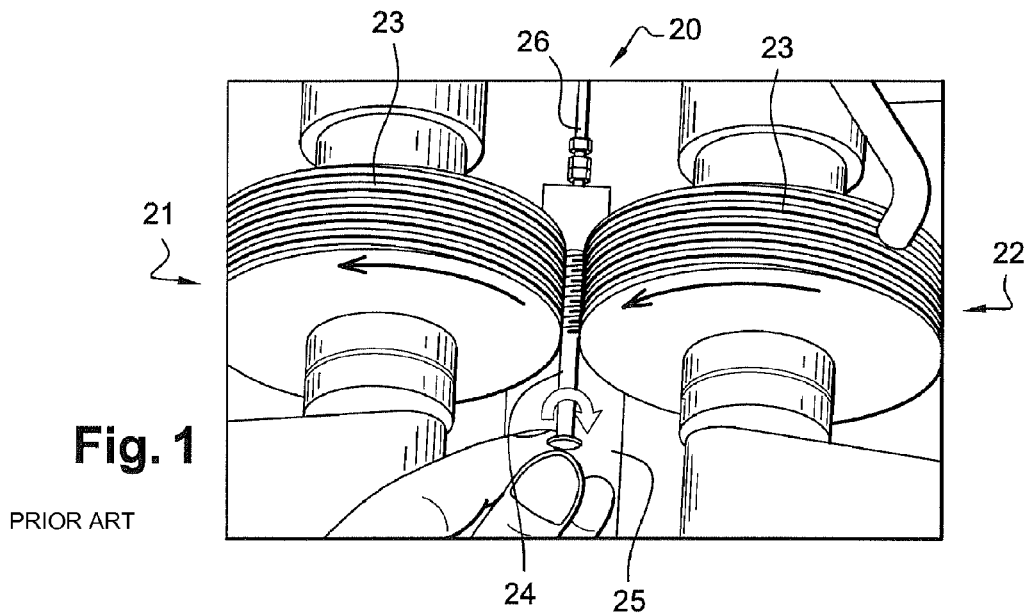
Fig. 1 PRIOR ART
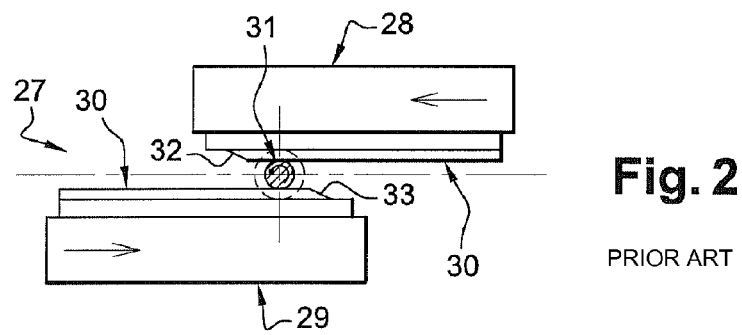
Fig. 2 PRIOR ART
| Threads | Screw pitch | Pitch of serrated roller | Variation | |
|---|---|---|---|---|
| 1 à 2 | 1,000 | 1,004 | = | 34 |
| 2 à 3 | 1,000 | 1,004 | | |
| 3 à 4 | 0,980 | 0,984 | − | 35 |
| 4 à 5 | 0,940 | 0,944 | | |
| 5 à 6 | 0,900 | 0,904 | | |
| 6 à 7 | 0,900 | 0,904 | = | 36 |
| 7 à 8 | 0,900 | 0,904 | | |
| 8 à 9 | 0,900 | 0,904 | | |
| 9 à 10 | 0,900 | 0,904 | | |
| 10 à 11 | 0,980 | 0,984 | | |
| 11 à 12 | 1,060 | 1,064 | + | 37 |
| 12 à 13 | 1,140 | 1,145 | | |
Fig. 3a

| Threads | Screw pitch | Pitch of serrated roller | Variation | |
|---|---|---|---|---|
| 1' à 2' | 1,000 | 1,004 | = | 38 |
| 2' à 3' | 1,000 | 1,004 | | |
| 3' à 4' | 0,999 | 1,003 | - | 39 |
| 4' à 5' | 0,998 | 1,002 | | |
| 5' à 6' | 0,993 | 0,997 | - - - | 40 |
| 6' à 7' | 0,992 | 0,996 | - | 41 |
| 7' à 8' | 0,992 | 0,996 | = | 42 |
| 8' à 9' | 0,992 | 0,996 | | |
| 9' à 10' | 0,993 | 0,997 | + | 43 |
| 10' à 11' | 0,997 | 1,001 | + + | 44 |
| 11' à 12' | 0,998 | 1,002 | | |
| 12' à 13' | 0,999 | 1,003 | | |
| 13' à 14' | 1,000 | 1,004 | + | 45 |
| 14' à 15' | 1,001 | 1,005 | | |
| 15' à 16' | 1,002 | 1,006 | | |
| 16' à 17' | 1,002 | 1,006 | = | 46 |
| 17' à 18' | 1,002 | 1,006 | | |
| 18' à 19' | 1,002 | 1,006 | | |
Fig. 4a
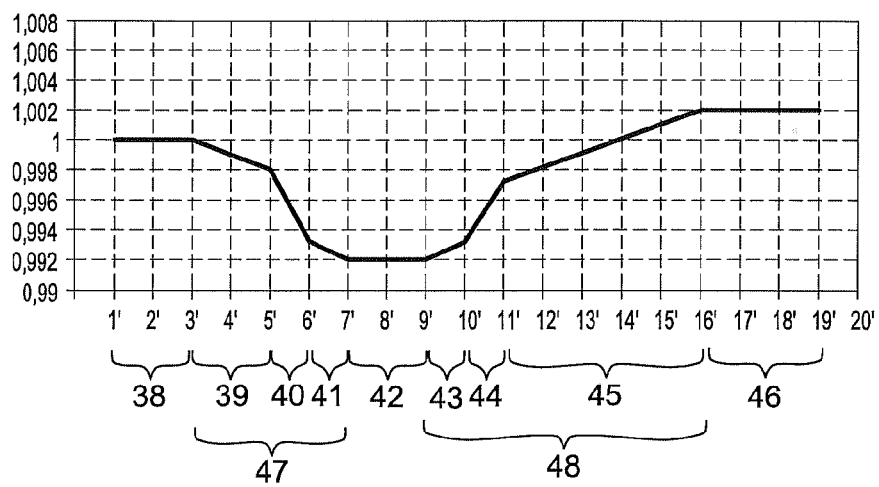
Fig. 4b
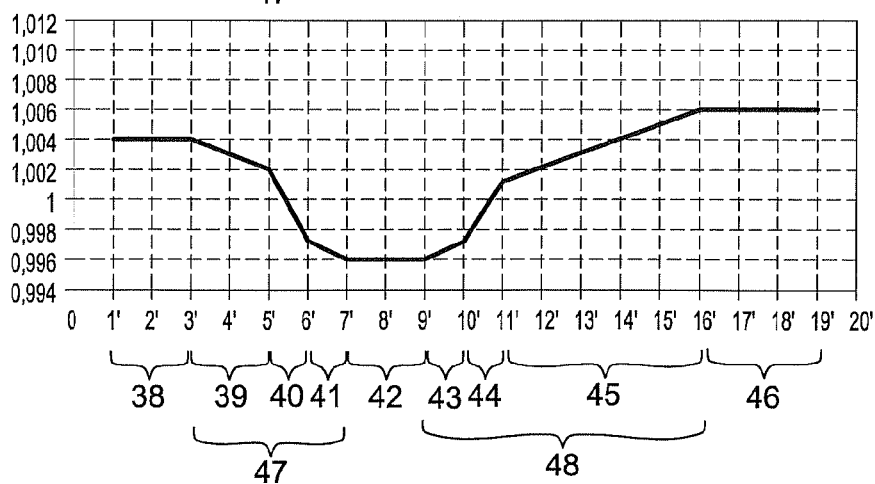
Fig. 4c

SCREW OR NUT WITH A THREAD A PITCH OF WHICH VARIES AND TOOL TO PRODUCE SAID SCREW OR NUT

CROSS REFERENCE TO RELATED APPLICATIONS

This application is a National Stage of International Application No. PCT/FR2010/050072, filed Jan. 19, 2010.

The present invention refers to a stress distribution thread.

The technical field of the invention is, generally, that of screws and nuts. More particularly, the invention relates to a variation of the thread pitch of the screws and nuts.

A thread can be provided with various profile geometries: it can be polygonal or unspecified and symmetrical or asymmetrical.

To thread a cylindrical surface, and thus to form a screw or a nut, several methods are known: machining, molding and hot or cold rolling. Rolling consists in a deformation of material. Many materials, even nonmetal materials, can used for cold rolling. The other materials can be heated at various temperatures for a short length of time.

FIG. 1 schematically represents an overall view in oblique perspective of an example of rolling of the state of the art. A specific tool 20 are made of two cylinders called serrated rollers 21 and 22. Each serrated roller 21 and 22 is provided with several threads 23 which are a counterpart of the desired thread for a stem 24 to be rolled. The tool 20 is placed on a machine called a rolling machine (not represented). In an example, the serrated rollers have a diameter which is much larger, ten to thirty times larger, than that of the stem 24 to be threaded.

The rolling of the stem 24 between the serrated rollers 21 and 22 comprises steps in which the serrated rollers 21 and 22 are adjusted in coincidence with each other and are indexed,
the stem 24 is fixed against the first serrated roller 21, against a stop 26 and on a support 25, said support 25 allowing a height adjustment of the stem 24, parallel to the axis of the serrated rollers,
the second serrated roller 22 is moved nearer so as to clamp the stem 24 therebetween,
the serrated rollers 21 and 22 are rotated in the same direction in order to make the stem 24 rotate and thus roll until reproducing the desired thread on it.

The axis of rotation of the stem is located slightly below a level formed by the axes of rotation of the serrated rollers 21 and 22 in order to avoid any possible ejection of the stem 24, during rolling.

In the example, the rolling is a plunge rolling. The stem 24 does not move because it is fixed against the stop 26 facing its large axis. The length of the screw thread obtained depends on the width of the serrated rollers 21 and 22 and on the geometry of the stem 24.

FIG. 2 schematically represents a view in profile of another rolling example in the state of the art. A specific tool is made up of two rectangular flat combs 28 and 29. Each comb 28 and 29 is provided with a series of oblique threads 30 extended in the direction of a large side of the rectangle, and able to deform a stem 31. The threads 30 are a counterpart of the desired thread for the stem 31.

The rolling between the combs 28 and 29 comprises steps in which the combs 28 and 29 are adjusted in coincidence with each other and are indexed,
the stem 31 is positioned against an end 32 of the first comb 28, parallel to the width of this comb 28,
an opposite end 33 of the second comb 29 is moved nearer, parallel to the first comb 28, so as to clamp the stem 31 therebetween,
the combs 28 and 29 are translated to and fro in order to make the stem 31 rotate and thus roll.

Alternatively, one of the two combs is fixed.

For reasons of productivity, quality and/or mechanical resistance, rolling is the threading method generally used by one skilled in the art.

Indeed, rolling has the advantage that the fiber orientation in the material are kept and reinforced, which endows the material with a better mechanical resistance and a better fatigue resistance.

These rolling techniques primarily make it possible to obtain regular threads, with a constant pitch.

However, a technical problem remains with regular threads engaged in a nut also provided with a regular thread. The load stress distribution on the threads engaged with a standard screw or nut is very unequal. Indeed, the first engaged thread, normally the nearest thread to a screw head, supports a great majority of the load. This load is reduced in a very important way from the second thread. In an example, if the load is too great, the first loaded thread gives way. The load is then transferred to another thread, which also gives way and thus all the threads give way successively.

One of the main aims of the invention is to optimize the mechanical resistance, the fatigue resistance and the static strength of screws and nuts by a better load distribution on several threads. According to the invention, one understands by screw any male solid element provided with an external thread and by nut any female solid element provided with an internal thread.

To this end, nuts were provided with threads having various variable pitches, while screws were provided with threads having regular pitches,
nuts were provided with threads having various variable pitches, while screws were provided with threads having variable pitches,
a series of tests were carried out under several conditions of use of the solid element such as a static or dynamic load, a traction and/or bending stress . . . .

We have found out that the modification of the pitch according to the use of the solid element makes it possible to optimize the stress distribution. The invention is based on the idea of using in a controlled way all the range of tolerance of the chosen pitch, in order to be able to modify the pitch in order that it is adapted in the best way to each load case.

In a particular example, we have found out that in fact the stress distribution is optimized at the very best by an increasing pitch. According to the invention, the idea is to come as close as possible to a minima of a chosen pitch tolerance, in order to be able to increase the pitch, which makes it possible to have a long pitch increase, as well as, preferably, an increase of the pitch acceleration.

Still in this example, the distribution of an axial load on the screw is in fact optimized by this large increase and, preferably, this acceleration.

According to the invention, a stress distribution on at least two, and in general three or four, threads is obtained. The thread is thus much more resistant.

In the prior art, one knows threads whose depth and/or pitch varies a lot in order to cause a self-clamping of a screw on a nut or a nut on a screw.

In the state of the art, one knows in particular the teaching of the document JP2007321858(A) which discloses a thread whose pitch gradually increases without causing self-clamping. The distribution obtained with this thread is however not sufficient to ensure a good mechanical resistance of the screws and nuts in their many uses.

The invention thus aims at a screw or a nut provided with a thread whose pitch varies within a preset range, between a minimum and a maximum,
the range belonging to a fixed tolerance,
the pitch decreasing and increasing in a controlled way, characterized in that, at the screwed place,
the pitch decrease angle has two degrees of slope, namely a moderate slope and a strong slope, and/or
the pitch increase angle has two degrees of slope, namely a moderate slope and a strong slope.

The invention also relates to a rolling tool of the cylindrical serrated roller type having a series of oblique threads able to deform a stem in order to produce a screw according to the invention, the threads having a basic profile whose apex is called thread crest, characterized in that
for the same X-coordinate along the serrated roller, all the thread crests are separated from each other by the same distance.

The invention also relates to a method for rolling a stem by means of two serrated rollers with variable pitch according to the invention, in which
the serrated rollers is adjusted in coincidence with each other and is indexed,
the screw is heated,
the screw is fixed against a first serrated roller and against a support,
a second serrated roller is moved nearer so as to clamp the stem therebetween,
the serrated rollers are rotated in the same direction to make the screw roll and thus make the stem with a variable pitch roll.

The invention also relates to a rolling tool of the flat rectangular comb type provided with a series of oblique threads extending in the direction of a large side of the rectangle, and able to deform a stem in order to produce a screw according to the invention, the threads having a basic profile whose apex is called thread crest, characterized in that
for the same X-coordinate measured on a small side of the rectangle, all the thread crests are separated from each other by the same distance.

The invention also relates to a method for rolling a stem by means of two combs having a variable pitch according to the invention, in which
the combs are adjusted in coincidence with each other and are indexed,
the stem is positioned against an end of a first comb, parallel to a width of this comb,
an opposite end of a second comb is placed, parallel to the first comb, so as to clamp the stem therebetween,
at least a comb is translated to and fro in order to make the screw rotate and thus make the stem with a variable pitch roll.

The invention also relates to a method for molding a screw according to the invention, in which
a mould is used which has an interior wall at least one part of which is threaded, the thread being a counterpart of the thread of the screw.

The invention also relates to a nut comprising an interior wall whose part is provided with an internal thread, the thread having a pitch whose value varies within a preset range, between a minimum and a maximum, characterized in that
the range belongs to a fixed tolerance, and in that, along the interior wall, the pitch varies in a controlled way.

The invention also relates to a method for machining a nut according to the invention, in which
the thread is carried out by means of a threading tool.

The invention also relates to a method for molding a nut according to the invention, in which
a mould is used which is provided in its center with a screw whose thread is a counterpart of the thread of the nut.

Figure 4D:
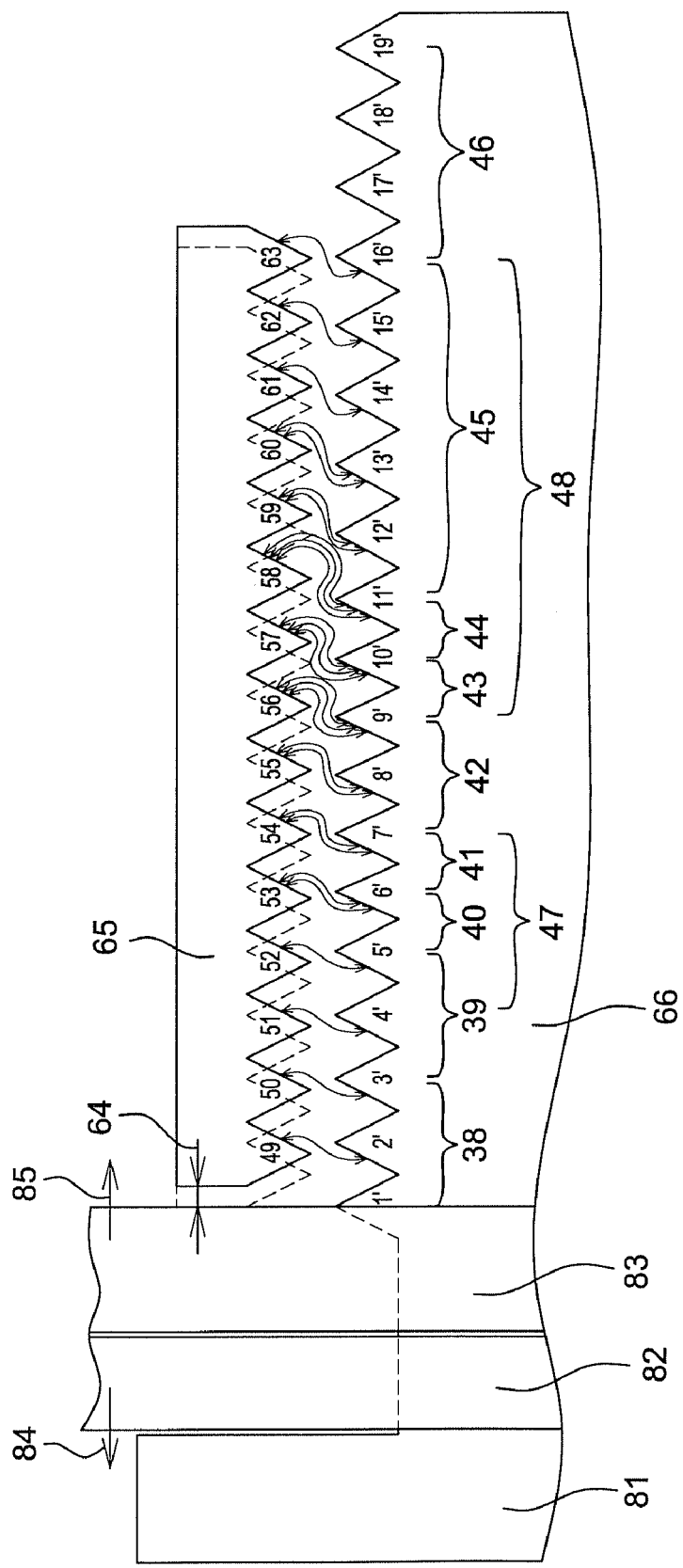

The invention and its various applications will be better understood with the reading of the following description and the examination of the annexed figures. These figures are only indicative and by no means limitative of the invention. The figures show:

FIG. 1, already described: a schematic representation of an overall view in oblique perspective of a rolling example in the state of the art, FIG. 2, already described: a schematic representation of a view in profile of a rolling example in the state of the art, FIG. 3a: a first example of a table of pitch variation for the threads of a screw and of a serrated rolling roller according to the invention, FIG. 3b: a schematic representation of a front view of the screw and of a periphery, laid down flat, of the first example of a serrated roller according to the invention, FIG. 3c: a graphic representation of the pitch variation for the same example of a screw according to the invention, FIG. 4a: a second example of a table of pitch variation for the threads of a screw and of a serrated rolling roller according to the invention, FIG. 4b: a graphic representation of the pitch variation for the same example of a screw according to the invention, FIG. 4c: a graphic representation of the pitch variation for the same example of a serrated roller according to the invention, FIG. 4d: a schematic representation of a cross-section of a nut and of the same example of a screw according to the invention.

The FIGS. 3a, 3b and 3c show a first example of the pitch variation for the threads of a screw and of a serrated rolling roller according to the invention. The amplitude of the pitch variation for this example is very exaggerated for sake of visibility of the graphic representation.

In an example, the invention relates to a connecting rod screw for a vehicle of the automobile type which must in addition withstand particularly high stresses.

The table in FIG. 3a shows that there is a ratio between a pitch of a cold serrated roller and a pitch of a corresponding hot screw. In the examples of the FIGS. 3a, 3b, 3c, 4a, 4b, 4c, and 4d, this ratio is 1.004. This ratio is an example relating to the rolling of a Nickel-based part which was brought up to a high temperature during a few seconds. Alternatively, the ratio is different, for example equal to 1 for a cold rolling since the problems of dilation do not play any role.

Alternatively, other materials can be used such as titanium-based compounds, Nickel-, stainless steel- or Cobalt-based alloys.

In this example, one considers a reference pitch equal to 1 millimeter.

Between the threads 1 to 2 and 2 to 3, the pitches have a constant value 34 equal to 1 for the screw and to 1.004 for the serrated rollers. Between the threads 3 to 4 and 4 to 5, the pitches undergo a moderate decrease 35 until reaching 0.940 for the screw and 0.944 for the serrated rollers. Between the threads 5 to 6, 6 to 7, 7 to 8 and 8 to 9, the pitches have a constant value 36 equal to 0.900 for the screw and 0.904 for the serrated rollers. Between the threads 9 to 10, 10 to 11 and 11 to 12, the pitches undergo a strong increase 37 until reaching 1.140 for the screw and 1.145 for the serrated rollers.

The screw pitch thus varies, in a controlled way. According to the invention, 'controlled' means a precision of pitch variation of about one micrometer, within a preset range here, between a minimum of 0.900 and a maximum of 1.140.

The pitch of the serrated rollers varies, also with a precision about one micrometer, within a preset range, between a minimum of 0.904 and one maximum of 1.145.

The FIG. 3b shows a periphery, laid down flat, of a rolling tool of the cylindrical serrated roller type 39 of the same type as those in FIG. 1. The serrated roller 39 has a series of helical threads 40 extending in the direction of a large side of the rectangle, and bale to deform a stem 38A, at the top of the drawing, to produce a screw 38B according to the invention, at the bottom of the drawing, and whose pitch varies as in the table in the FIG. 3a. In an example, the threads 40 have an equilateral triangular section one apex of which is called thread crest. According to the invention, for the same X-coordinate along the serrated roller 39, all the thread crests of the threads 40 are separate from each other by the same distance 78. In this respect, the FIG. 3b indicates that the distance separates crests of consecutive threads according to a circumferential measurement of the serrated roller. A gap 80 separates crests of consecutive threads in an axial direction of the serrated roller. The pitch 79 of the screw results from the variation of the distance 78 according to the X-coordinate 72.

In the FIG. 3b, the distances 70 and 71, corresponding to a X-coordinate 72 measured parallel to the axis 73 of the serrated roller, between the threads 74 and 75 on the one hand and 75 and 76 on the other hand, are equal to one another, and so on along the elevation at the X-coordinate 72. It is the same for each part 34, 35, 36 and 37.

In a more general way, the basic profile of the threads has a polygonal or unspecified form. Among the polygonal forms, one distinguishes in particular the pointed, truncated and rounded, symmetrical or asymmetrical triangles.

After at least one full rotation in contact with the serrated roller 39, the stem 38A becomes the screw 38B whose threads has a pitch varying in the same way as those of the serrated roller 39, while starting by decreasing as much as possible from a head 67 of the screw 38B, before strongly increasing as fast as possible. Indeed in the example, the greater pitch increase angle allows a correction in the totality of the range, for six threads at the maximum.

The method for rolling a stem by means of two serrated rollers according to the invention comprises, compared to the current state of the art, a step in which the stem is rolled with a variable pitch.

The development of the invention required to precisely measure the distances, gaps and serrated roller pitches. An apparatus called contouroscope is often used, for this purpose, by one skilled in the art for measuring and checking the pitches of serrated rollers on all their peripheral surface and for transcribing the results by data processing in order to deduce some possible degradations of the threads. The measurements are carried out for example every quarter turn.

In an example of the invention, the pitch variation is a piecewise linear function. Thus, a first piece 34 corresponds to a regular pitch like the screws of the state of the art. A piece 35 corresponds to a decrease of the pitch, in order to be close to a minimal value. A piece 36 allows a stabilization with the smallest possible pitch. A strongly increasing piece 37 ensures the stress distribution on several, two, three or four threads so as to reinforce the stability.

Regarding the part 35, in which the pitch decreases, it is observed a thread slope which is greater at the bottom of the drawing, where the threads tend to be vertical, than at the top of the drawing where they tend to be horizontal. In the part 37, it is the contrary. In all the cases, for a given X-coordinate, the distances between the threads are constant.

Typically, a standard nut can be screwed around the screw 38B, without any self-locking, contrary to threads with variable pitches of the state of the art. However, it would be possible to additionally modify the pitch of a nut in order to obtain such a self-locking.

Alternatively, it is used a rolling tool comprising two rectangular flat combs of the same type as those in the FIG. 2. These combs are provided with a series of oblique threads extending in the direction of a large side of the rectangle, and able to deform a stem in order to produce a screw according to the invention. The threads also have a triangular basic profile. For the same X-coordinate measured on a small side of the rectangle, all the thread crests are separated from each other by the same distance.

The method for rolling a stem by means of two combs comprises, compared to the current state of the art, a step in which the stem having a variable pitch is rolled.

Alternatively, for manufacturing such a nut, it is used a mould having an interior wall at least one part of which is threaded, the thread being a counterpart of the thread of the screw with a variable pitch according to the invention.

Alternatively, the invention relates to a nut with a variable pitch which can be screwed around a standard screw. Such a nut comprises an interior wall a part of which is provided with a thread. The thread has a pitch whose value varies within a small preset range, between a minimum and a maximum. The range belongs to a fixed, for example standardized, tolerance. Preferably, along the interior wall, the pitch varies in a controlled way according to the load case applied.

The method for machining such a nut with a variable pitch according to the invention comprises a step in which the internal thread is carried out by means of a threading tool.

Alternatively, it is used a mould comprising in its center a part having the form of a screw whose thread is a counterpart of the thread of the nut with a variable pitch according to the invention.

The FIGS. 4a, 4b, 4c and 4d show a second example of variation of a thread pitch of a screw and of a serrated rolling roller according to the invention. The amplitude of variation of the pitch in this example is more realistic than in the preceding one as it is not graphically represented.

The serrated rollers and the combs implemented in this example are not represented in the figures but they are of the same type as those described in the FIGS. 1 and 2.

In this example, it is considered a reference pitch equal to 1 millimeter. The screw pitch thus varies, in a controlled way. According to the invention, the control of the pitch variation is obtained with a precision of about one micrometer within a preset range.

The range belongs here to a fixed tolerance, for example an ISO standard. This standard has a minimum of 0.990 for the screw and of 0.994 for the serrated roller and a maximum of 1.010 for the screw and of 1.014 for the serrated roller. The tolerance is thus of 20 micrometers in both cases, which represents a ratio of 2% of the pitch. In this example, along the screw, starting from the head, the pitch is initially stable, then is decreasing, and finally is increasing again before being stabilized.

The table in the FIG. 4a shows that there is here also a ratio of 1.004 between a pitch of serrated roller and a corresponding screw pitch. This ratio is an example relating to the rolling of a nickel-based part which was brought up to a high temperature during a few seconds. Alternatively, the ratio is different, for example equal to 1 for a cold rolling.

Between the threads 1' to 2' and 2' to 3', the pitches remain at a constant value 38 of 1 for the screw and of 1.004 for the serrated rollers. Between the threads 3' to 4' and 4' to 5', the pitches undergo a moderate decrease 39 until reaching 0.998 for the screw and 1.002 for the serrated rollers. Between the threads 5' to 6', the pitches undergo a significant decrease 40 until reaching 0.993 for the screw and 0.997 for the serrated rollers. Between the threads 6' to 7', the pitches undergo a smaller decrease 41 until reaching 0.992 for the screw and 0.996 for the serrated rollers. Between the threads 7' to 9', the pitches remain at a constant value 42 of 0.992 for the screw and of 0.996 for the serrated rollers. Between the threads 9' to 10', the pitches undergo a moderate increase 43 until reaching 0.993 for the screw and 0.997 for the serrated rollers. Between the threads 10' to 11', the pitches undergo a considerable increase 44 until reaching 0.997 for the screw and 1.001 for the serrated rollers. Between the threads 11' to 16', the pitches undergo a moderate increase 45 until reaching 1.002 for the screw and 1.006 for the serrated rollers. Between the threads 16' and 19', the pitches have a constant value 46 equal to 1.002 for the screw and to 1.006 for the serrated rollers.

The pitch decrease angle 47 undergoes a deceleration 41 before a return to the constant pitch 42 with a value close to the minimal limit of tolerance. Such a deceleration makes it possible to join the area of transition 42 smoothly.

A pitch increase angle 48 thus has three degrees of slope, namely initially the first weak degree of slope 43, then the strong degree of slope 44, and finally the moderate degree of slope 45.

The screw threads have a pitch which varies in the same way as those of the serrated roller, by stagnating first, then by decreasing and finally by increasing. The screw pitch can be decreased, then increased at the desired speed by applying a slope acceleration.

The screw pitch thus varies, in a controlled way with a precision of about one micrometer, within a preset range, between a minimum of 0.992 and a maximum of 1.002. In the example, the maximum is rather far away from the maximum of the tolerance.

The pitches of the serrated rollers vary, also with a precision of about one micrometer, within a preset range, between a minimum of 0.996 and a maximum of 1.006.

Preferably, and generally, the idea of the invention is to use possible the extreme values that are as close as possible to the selected tolerance.

According to the invention, a difference of two micrometers is maintained between the extreme values of the screw pitch and the extreme values of the range of tolerance because the rolling precision is today of about one micrometer. This difference aims at not exceeding the imposed tolerance.

In an example, the pitch variation is piecewise linear function.

In an example, the stress distribution for the above-mentioned example of the screws 66 can be explained as follows:

The FIG. 4d schematically represents a cross-section of a standard nut 65 screwed around a screw 66 according to the invention. A head 81 of the screw 66 and the standard nut 65 clamp between them two plates 82 and 83 one against the other. The nut 65 is presented in a retracted situation in straight lines, and in a screwed situation in dotted lines.

The threads 1' to 19' of the screw 66 correspond to those in the FIGS. 4a and 4b. The dotted lines symbolize the threads 49 to 63 of the standard nut 65 at the time of the contact with the plate 83, at the end of screwing. At the beginning of tightening, when the nut comes into contact with the plate 83, one has the impression that nothing moves, but because of the appearance of two forces, represented by arrows 84 and 85, for spacing apart the two plates 82 and 83, the threads of the nut 65 become deformed and move back by a distance 64 of a few tenths of a millimeter compared to the head 81 of the screw 66.

At that time, the tightened threads 49 to 63 share the stresses as follows.

The threads 49 to 52 of the standard nut 65, corresponding to the areas 38 and 39, slightly bear, but in a balanced way, on the threads 2' to 5' of the screw 66. This weak bearing of a thread of the nut 65 on a screw thread 66 is schematically represented by only one bidirectional arrow.

The threads 53 to 55 of the standard nut 65, corresponding to the areas 40 to 42, moderately bear, but in a balanced way, on the threads 6' to 8' of the screw 66. This moderately bearing of a thread of the nut 65 on a screw thread 66 is schematically represented by two bidirectional arrows.

The threads 56 to 58 of the standard nut 65, corresponding to the areas 42, 43 and 44, strongly bear, but in a balanced way, on threads 9' to 11' of screw 66. The strong bearing of a thread of the nut 65 on a screw thread 66 is schematically represented by three bidirectional arrows.

The threads 59 to 60 of the standard nut 65 corresponding to a first part of the area 45, moderately bear, but in a balanced way, on the threads 12' and 13' of the screw 66.

The threads 61 to 63 of the standard nut 65 corresponding to a second part of the area 45, slightly bear, but in a balanced way, on the threads 14' to 16' of the screw 66.

In this case, the stress distribution is homogenized on all the screw threads, thanks to the variation of the screw pitch, and thus is not substantially on the first threads any more, as in the state of the art.

Generally, it is obtained an increase in the mechanical resistance from 5 to 10%, in particular regarding the characteristics of fatigue resistance, for a threaded piece with a variable pitch according to the invention.

The invention claimed is:

1. Screw or nut provided with a thread whose pitch varies within a preset range, between a minimum and a maximum, the range belonging to a fixed tolerance, the pitch decreasing and increasing in a controlled way, wherein at least one of,
   the pitch decreases over a plurality of threads according to two different slopes, one of said slopes being stronger than the other slope; or
   the pitch increases over a plurality of threads according to two different slopes, one of said slopes being stronger than the other slope;
   and wherein
   along the screw or nut, starting from a first end, the pitch has a variation that decreases then increases,
   before and after the variation, the pitch has a first constant value,
   after decreasing, and before increasing, the pitch has a second constant value close to a minimum of the tolerance.

2. Screw or nut according to claim 1, characterized in that at least one of:
   that the pitch decreases according to three different slopes, a first slope being weaker than a second and a third slope, or
   that the pitch increases according to three different slopes, a first slope being weaker than a second stronger slope, said second stronger slope being followed by a third slope, said third slope being weaker than the second stronger slope and longer than the first slope, said third slope creating an inflection compared to the second stronger slope, this inflection allowing a correction within the totality of the tolerance, for six threads at a maximum.

3. Screw or nut according to claim 1, characterized in that the fixed tolerance is a standardized tolerance, the control of the pitch variation corresponds to a precision of about one micrometer.

4. Rolling tool of the cylindrical serrated roller type provided with a series of helical threads extending in the direction of a large side of the rectangle, and able to deform a stem to produce a screw according to claim 1, the threads presenting a basic profile whose apex is called thread crest, characterized in that for a given X-coordinate along the serrated roller, all the thread crests are separated from each other by the same distance.

5. Method for rolling a stem by means of two serrated rollers having a variable pitch according to claim 1, in which the serrated rollers are adjusted in coincidence with each other and are indexed, the stem is heated, the stem is fixed against a first serrated roller, a stop and on a support, the support allowing a height adjustment of the stem, parallel to the axis of the serrated rollers, a second serrated roller is moved nearer so as to clamp the stem therebetween, the serrated rollers are rotated in the same direction in order to make the screw rotate and thus the stem with a variable pitch roll.

6. Rolling tool of the flat rectangular comb type provided with a series of oblique threads extending in the direction of a large side of the rectangle, and able to deform a stem in order to produce a screw according to claim 1, the threads having a basic profile whose apex is called thread crest, characterized in that for a given X-coordinate measured on a small side of the rectangle, all the thread crests are separated from each other by the same distance.

7. Method for rolling a stem by means of two combs having a variable pitch according to claim 6, in which the combs are adjusted in coincidence with each other and are indexed, the stem is positioned against an end of a first comb, parallel to a width of this comb, an opposite end of a second comb is placed, parallel to the first comb, so as to clamp the stem therebetween, at least one comb is translated to and fro in order to make the screw roll and thus the stem having a variable pitch roll.

8. Method for molding a screw according to claim 1, in which a mould is used which has an interior wall at least one part of which is threaded, the thread being a counterpart of the thread of the screw.

9. Method for machining a nut according to claim 1, in which the internal thread is carried out by means of a threading tool.

10. Method for molding a nut according to claim 1, in which a mould is used which has in its center a screw whose thread is a counterpart of the thread of the nut.

11. The screw or nut according to claim 1, characterized in that the plurality of threads have a crest having a constant diameter.

12. Screw or nut provided with a thread whose pitch varies within a preset range, between a minimum and a maximum, the range belonging to a fixed tolerance, the pitch decreasing and increasing in a controlled way, and wherein the pitch both decreases and increases over a plurality of threads in a first direction according to two different slopes, one of said slopes being stronger than the other slope.

13. The screw or nut according to claim 12, characterized in that:

the pitch decreases according to three different slopes, a first slope being weaker than a second and a third slope, and the pitch increases according to three different slopes, a first slope being weaker than a second stronger slope, said second stronger slope being followed by a third slope, said third slope being weaker than the second stronger slope and longer than the first slope, said third slope creating an inflection compared to the second stronger slope, this inflection allowing a correction within the totality of the tolerance, for six threads at the maximum.

* * * * *